United States Patent
Gandhi et al.

(10) Patent No.: US 12,477,331 B2
(45) Date of Patent: Nov. 18, 2025

(54) CONTINUOUS MULTI-FACTOR AUTHENTICATION USING WIRELESS SENSING DATA

(71) Applicant: Cisco Technology, Inc., San Jose, CA (US)

(72) Inventors: Indermeet Singh Gandhi, San Jose, CA (US); Frank Michaud, Pully, VA (US); Jerome Henry, Pittsboro, NC (US); David A. Maluf, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 18/319,400

(22) Filed: May 17, 2023

(65) Prior Publication Data
US 2024/0388901 A1  Nov. 21, 2024

(51) Int. Cl.
G06F 7/04 (2006.01)
H04L 9/40 (2022.01)
H04W 12/06 (2021.01)

(52) U.S. Cl.
CPC .............. *H04W 12/06* (2013.01); *H04L 63/20* (2013.01); *H04L 2463/082* (2013.01)

(58) Field of Classification Search
CPC ... H04W 12/06; H04L 63/20; H04L 2463/082
See application file for complete search history.

(56) References Cited

U.S. PATENT DOCUMENTS

| | | | |
|---|---|---|---|
| 2015/0242605 A1 | 8/2015 | Du et al. | |
| 2020/0092314 A1* | 3/2020 | Mital | G06F 21/6218 |
| 2020/0322330 A1 | 10/2020 | Lynn et al. | |
| 2021/0224374 A1 | 7/2021 | Fong et al. | |
| 2022/0070178 A1* | 3/2022 | Lee | H04L 63/0876 |
| 2022/0078610 A1 | 3/2022 | Montemurro et al. | |
| 2022/0255942 A1 | 8/2022 | Szigeti et al. | |
| 2023/0065765 A1* | 3/2023 | Vadlamani | G06F 21/32 |

OTHER PUBLICATIONS

Shah et al, Towards a Lightweight Continuous Authentication Protocol for Device-to-Device Communication, IEEE, Jan. 29, 2021, pp. 1119-1126. (Year: 2021).*
Wang et al, Deep Neural Networks for CSI-Based Authentication, IEEE, Aug. 30, 2019, pp. 123034-123026. (Year: 2019).*
Du et al., "An Overview on IEEE 802.11bf: WLAN Sensing," arXiv:2207.04859v1, Jul. 11, 2022, downloaded from https://arxiv.org/pdf/2207.04859.pdf, 23 pages.

* cited by examiner

*Primary Examiner* — Philip J Chea
*Assistant Examiner* — Jenise E Jackson
(74) *Attorney, Agent, or Firm* — Lee & Hayes, P.C.

(57) ABSTRACT

A method of continuous multi-factor authentication may include executing wireless sensing based at least in part on execution of a continuous multi-factor authentication (CMFA) application at a computing device, collecting channel state information (CSI) data from a network device communicatively coupled to the computing device, transmitting the CSI data to a CMFA device, and receiving a trust score from the CMFA device based on the CSI data.

20 Claims, 8 Drawing Sheets

CONTINUOUS MULTI-FACTOR AUTHENTICATION USING WIRELESS SENSING DATA

TECHNICAL FIELD

The present disclosure relates generally to computing device security. Specifically, the present disclosure relates to systems and methods for providing continuous multi-factor authentication using wireless sensing data.

BACKGROUND

Users and devices may be authenticated with usernames and passwords, pin codes, two factor authentication, or cryptographic keys. However, all of these authentication methods are vulnerable to some degree, and each comes with various drawbacks. One is that it is difficult to authenticate entities with high certainty. Further, trusted devices may become compromised or stolen. Still further, login application or service providers may learn and collect personal information and personal identifying information. Even still further, authentication mechanisms may focus on initiating a session and may be, therefore, vulnerable to devices that have an authenticated session being stolen such as, for example, when the user walks away from the computing device.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
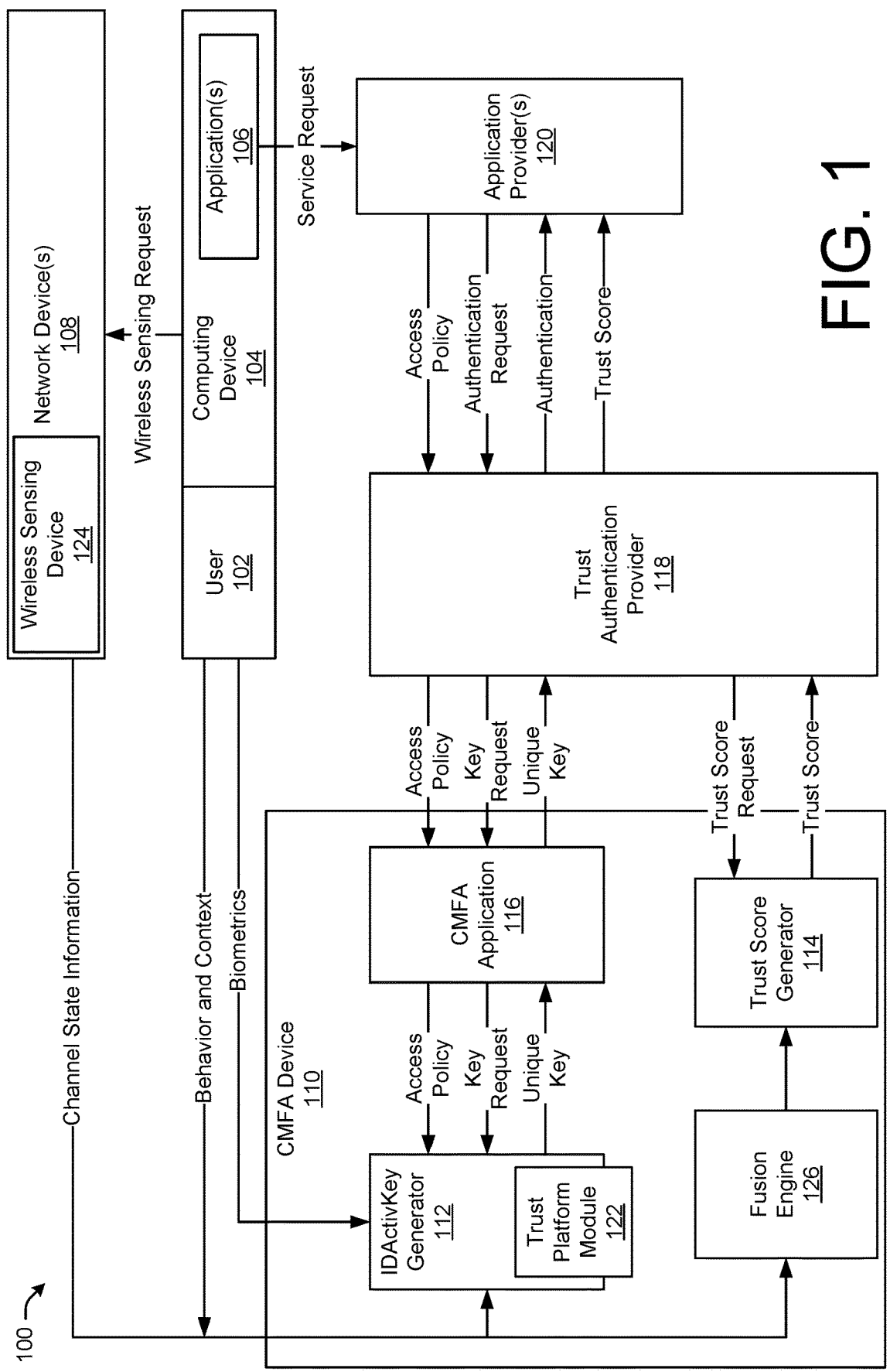
FIG. 1 illustrates a configuration of devices and a network associated with a continuous multi-factor authentication (CMFA) system, according to an example of the principles described herein.

Continuous multi-factor authentication (CMFA) leverages biometric factors such as, for example, facial recognition, voice recognition, device-orientation, and user gait, among other biometric factors, as well as supplementary factors such as, for example, global positioning system (GPS) location data, network association and context-fusion of peripheral devices, etc. to derive the identity posture of the user expressed as a trust score. The trust score may adapt the authorization levels granted to the users and may represents how confident the CMFA system may be that the individual accessing the computing device is in fact the expected user and that the user environment and content are complying with an access policy for a service or resource utilized via the computing device. The more factors a CMFA system may combine into its trust score calculation, the higher the accuracy of the derived composite trust score used to verify the authorization levels of the user.

CMFA and associated identity postures and trust scores may be used in the authentication of the user as well as in granting authorization to the user. The latter is related to the concept of continuous risk-based authorization. The trust score may be based on biometric factors, device-based factors, location factors, and behavioral factors, among others.

This disclosure describes the augmentation of the attributes for user identity posture and a resulting trust score by monitoring the environment around an already authenticated user through wireless-based factors. Examples described herein provide a non-transitory computer-readable medium storing instructions that, when executed, causes a processor to perform operations, including executing wireless sensing based at least in part on execution of a continuous multi-factor authentication (CMFA) application at a computing device, collecting channel state information (CSI) data from a network device communicatively coupled to the computing device, transmitting the CSI data to a CMFA device, and receiving a trust score from the CMFA device based on the CSI data.

The operations may further include determining if the CSI data has changed and adjusting the trust score based at least in part on the CSI data having changed to define an updated trust score. The operations may further include adjusting access via the computing device to at least one resource provided to the computing device based at least in part on the updated trust score. The operations may further include establishing baseline CSI data.

The operations may further include adjusting access to the computing device based at least in part on the trust score. The operations may further include adjusting access via the computing device to at least one resource provided to the computing device based at least in part on the trust score. The collecting of the CSI data from the network device communicatively coupled to the computing device may include collecting the CSI data from a plurality of network devices communicatively coupled to the computing device. The CSI data may include long cycles defining static objects within an environment of the computing device, and short cycles defining non-static objects within the environment of the computing device.

Examples described herein also provide a system including a processor and a non-transitory computer-readable media storing instructions that, when executed by the processor, causes the processor to perform operations. The operations may include executing wireless sensing based at least in part on execution of a continuous multi-factor authentication (CMFA) application at a computing device, collecting channel state information (CSI) data from a network device communicatively coupled to the computing device, transmitting the CSI data to a CMFA device, receiving a trust score from the CMFA device based on the CSI data.

The operations may further include determining if the CSI data has changed and adjusting the trust score based at least in part on the CSI data having changed to define an updated trust score. The operations may further include adjusting access via the computing device to at least one resource provided to the computing device based at least in part on the updated trust score. The operations may further include establishing baseline CSI data.

The operations may further include adjusting access to the computing device based at least in part on the trust score. The operations may further include adjusting access via the computing device to at least one resource provided to the computing device based at least in part on the trust score.

The collecting of the CSI data from the network device communicatively coupled to the computing device may include collecting the CSI data from a plurality of network devices communicatively coupled to the computing device. The CSI data may include long cycles defining static objects within an environment of the computing device and short cycles defining non-static objects within the environment of the computing device.

Examples described herein also provide a method of continuous multi-factor authentication. The method may include executing wireless sensing based at least in part on execution of a continuous multi-factor authentication (CMFA) application at a computing device, collecting channel state information (CSI) data from a network device communicatively coupled to the computing device, transmitting the CSI data to a CMFA device, and receiving a trust score from the CMFA device based on the CSI data.

The method may further include determining if the CSI data has changed, adjusting the trust score based at least in part on the CSI data having changed to define an updated trust score, and adjusting access via the computing device to at least one resource provided to the computing device based at least in part on the updated trust score. The method may further include adjusting access to the computing device based at least in part on the trust score. The method may further include adjusting access via the computing device to at least one resource provided to the computing device based at least in part on the trust score.

Additionally, the techniques described herein may be performed by a system and/or device having non-transitory computer-readable media storing computer-executable instructions that, when executed by one or more processors, performs the method described above.

Example Embodiments

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

It is hard to overstate the importance of proper continuous identification authentication in networking contexts. As networking devices have become ubiquitous in business, government, and private life, ensuring that network users "are who they say they are" is a fundamental challenge in modern security. In recent years, a proliferation of strategies, including two-factor authentication and biometric authentication, among others, have attempted to address this problem. However, these solutions and others fall short of obtaining their true objective: to ensure with high certainty who is using a device or service at any given moment. Broadly speaking, there are four primary challenges facing any authentication technology: 1) authenticating a specific device, 2) authenticating a user on that device, 3) protecting users and devices from collection of sensitive information, and 4) maintaining device and user authentication over the course of a session while preserving their privacy. The present technology aims to address all four of these problems with a continuous multi-factor authentication scheme.

The present technology may continuously utilize multi-factor authentication techniques and including wireless sensing data to verify the identity of a user and authenticate access devices to ensure device and networking security and does so in such a way that sensitive information is shielded from data collection practices. The present technology is a system that may utilize a CMFA device to continuously authenticate a user. The CMFA device may be the device in the continuous multi-factor authentication system to learn personal identifying information of the user.

As explained in further detail herein, the CMFA device may obtain channel state information (CSI) from a wireless sensing device and derive an identification credential (an IDActivKey) that is unique to every service or resource which requires authentication of a user. The identification credential may be derived by combining biometric information of a user and hardware cryptographic information given the appropriate "context" of the user such as an environment or a location, a proximity to another device, or other contextual information. The CMFA device may repeatedly calculate a trust score indicating the confidence the CMFA device may have in the user authentication, the presence of the user, or the compliance with access policies defined by the service or resource.

The present technology is useful to authenticate a user or device to a service or resource prior to authorizing access to the service or resource, and to calculate a trust score that may be used to determine whether the authenticated user session should remain in place. The service or resource may interact with an authentication provider in order to provide a policy that specifies conditions upon which a user should be authenticated and conditions upon which an authenticated user may remain in an established session. The authentication provider may interface with the CMFA device to inform the user of policy requirements.

While the present technology is called a continuous multi-factor authentication system, and some aspects of the present technology call for continuous authentication or continuous calculation of trust scores or other continuous activities, "continuous" may refer to repeated or periodic actions that confirm authentication or trust in authentication. The term continuous also does not refer to an infinite duration, and, rather, may, in one example, be limited to the length of a session with an access device or application or service provider.

FIG. 1 illustrates an example configuration of devices and a network associated with a continuous multi-factor authentication (CMFA) system 100, according to an example of the principles described herein. As illustrated in FIG. 1, a user 102 may send a service request via a computing device 104 to a number of application provider(s) 120. The application provider(s) 120 may include any number of services, resources, devices, or entities to which the computing device 104 may connect. For example, the application provider(s) 120 may include a social media service, a bank, a hospital, a motor vehicle department, a voting system, an IoT device, or other access device.

The application provider(s) 120 may authenticate the identity of the user 102 through a trust authentication provider 118, which is in communication with a continuous multi-factor authentication (CMFA) device 110 to authenticate the identity of user 102. The user 102 may be any user including an employee, contractor, client, member of an organization, or private individual, etc. attempting to access a service. The computing device 104 may be a mobile device, a personal computer or other computing device via which the user 102 may access the service. Further, the computing device 104 may or may not be the same device as the CMFA device 110 or may or may not contain the CMFA device 110. In one example, the CMFA device 110 may be used to log in to the computing device 104.

The CMFA device 110 may gather data ultimately used to authenticate the user 102 to the application provider(s) 120 when a request is sent by the application provider(s) 120 to the trust authentication provider 118 to authenticate the user 102. The trust authentication provider 118 may request the CMFA device 110 to provide an identification credential (e.g., an IDActivKey) that is unique to the application provider(s) 120. The CMFA device 110 may be associated with user 102, and may gather biometric, behavioral, and contextual data. Further, the CMFA device 110 may be associated with a number of network device(s) 108. The network device(s) 108 may include any number of computing devices within the CMFA system 100 capable of obtaining channel state information (CSI) associated with the use of the computing device 104 within any environment.

The CSI may include any known channel properties of a communication link. The CSI defines how a signal propagates from a transmitter to a receiver and represents the combined effect of, for example, scattering, fading, and power decay with distance. The method is called Channel estimation. The CSI makes it possible to adapt transmissions to current channel conditions, which is crucial for achieving reliable communication with high data rates in multiantenna systems. Stated another way, CSI may define any changes in the wireless signal patterns in the environment in which the computing device 104 and/or the CMFA system 100 as a whole operates. CSI may be able to provide finer-grained wireless channel information at the physical layer, which is thus considered as an alternative solution for accurate sensing. CSI may contain both channel amplitude and phase information over different subcarriers that provide the capability to discriminate multi-path characteristics. For example, by processing the spatial-, frequency-, and time-domain CSI at multiple antennas, subcarriers, and time samples via fast Fourier transform (FFT), detailed multi-path parameters such as angle-of-arrival (AoA), time-of-flight (ToF), and/or doppler frequency shift (DFS) may be extracted. Other advanced super-resolution techniques such as estimation of signal parameters via rotation invariance techniques (ESPRIT), multiple signal classification (MUSIC), and the space alternating generalized expectation-maximization (SAGE) algorithm may also be utilized to extract more accurate target-related parameters from the CSI. A CSI-based sensing approach has been demonstrated to provide high sensing accuracy for detection and tracking static and non-static objects within the environment.

Figure 2:
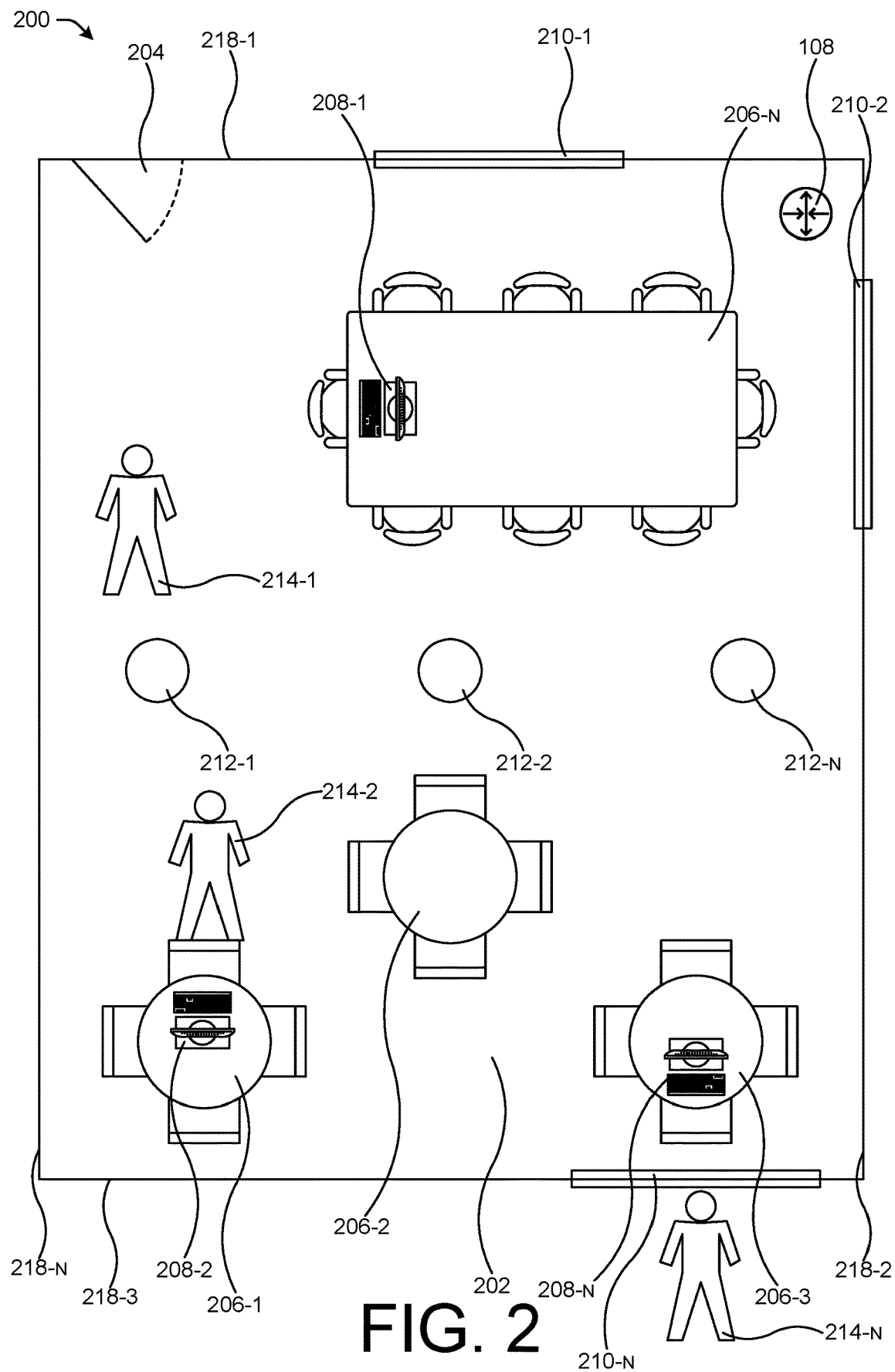
FIG. 2 illustrates an environment in which the CMFA system of FIG. 1 may be executed, according to an example of the principles described herein.

FIG. 2 illustrates an environment 200 in which the CMFA system 100 of FIG. 1 may be executed, according to an example of the principles described herein. In one example, the environment 200 may include a room 202 with a number of static and non-static elements included therein. In other words, the environment 200 may include a number of static and non-static, moving objects. For example, the environment 200 may include a number of walls 218-1, 218-2, 218-3, ... 218-N, where N is any integer greater than or equal to 1 (collectively referred to herein as wall(s) 218 unless specifically addressed otherwise) that defines the boundary of the environment 200 and which may be detectable by the CMFA system 100 described herein. Further, the environment 200 may include furniture such as a number of tables 206-1, 206-2, 206-3, ... 206-N, where N is any integer greater than or equal to 1 (collectively referred to herein as table(s) 206 unless specifically addressed otherwise). In one example, the environment 200 may further include a number of additional structural elements such as, for example a number of pillars 212-1, 212-2, ... 212-N, where N is any integer greater than or equal to 1 (collectively referred to herein as pillars(s) 212 unless specifically addressed otherwise). Further, the environment may include a number of windows 210-1, 210-2, ... 210-N, where N is any integer greater than or equal to 1 (collectively referred to herein as window(s) 210 unless specifically addressed otherwise). The environment 200 may also include a number of doors 204 and other elements of an environment. The stationary elements described in connection with FIG. 2 are presented as examples, and any number or type of stationary elements may be included in the environment 200.

The network device(s) 108 may also be included in the environment 200 to assist in the wireless sensing via the wireless sensing device 124. In the example of FIG. 2, the network device(s) 108 may include an access point such as a wireless router. However, the network device(s) 108 may include any device that may be used to detect the environment 200 and elements of the environment 200. Further, even though one network device 108 is depicted in FIG. 2, the environment may include any number of the network device(s) 108 that work together to gather the CSI data via their respective wireless sensing device 124.

Further, the environment 200 may include a number of computing devices 208-1, 208-2, 208-N, where N is any integer greater than or equal to 1 (collectively referred to herein as computing device(s) 208 unless specifically addressed otherwise), and computing device 208-2 may be the computing device 104 utilized by the user 102 (e.g., individual 214-2) of FIG. 1.

Still further, the environment 200 may include a number of individuals 214-1, 214-2, ... 214-N, where N is any integer greater than or equal to 1 (collectively referred to herein as individual(s) 214 unless specifically addressed otherwise). In the examples described herein, individual 214-2 may be the user 102 that is utilizing the computing device 104. It is noted that in the example environment of FIG. 2, another individual 214-1 is standing behind the user 102 (e.g., individual 214-2) as the user 102 (e.g., individual 214-2) is operating the computing device 104 (e.g., computing device 208-2). This may create a serious risk to the user 102 and any resources the user 102 is utilizing or viewing on the computing device 104 (e.g., computing device 208-2) since the other individual 214-1 can view what the user 102 (e.g., individual 214-2) is viewing on their computing device 104 (e.g., computing device 208-2). Similarly, if the user 102 were utilizing computing device 208-3 with yet another individual 214-N viewing the computing device 208-3, this can pose the same security risks. It may be noted here that the network device(s) 108 may be able to detect stationary and non-stationary objects such as, for example, the other individual 214-N past the walls 218 of the environment 200 and that the walls 218, although defining a general boundary of the environment 200 may not define the boundary at which the network device(s) 108 may detect the stationary and non-stationary objects. With this understanding, the CMFA system 100 of FIG. 1 may be used to mitigate or eliminate the security risks associated with the user 102 operating the computing device 104 within the environment 200.

Thus, the network device(s) 108 may further include a wireless sensing device 124 used to measure and/or capture any state of the environment 200 in which the computing device 104 and/or the CMFA system 100 operates. The wireless sensing device 124 may detect the present of stationary elements within the environment 200 such as walls of a room, pillars and other structural elements of a building, tables, chairs, appliances, ceilings, floors, windows, decorative plants, other stationary elements within an environment 200, and relative locations of all these stationary elements within the environment 200 of the computing device 104 with respect to one another. Further, the wireless sensing device 124 may be capable of identifying a specific environment 200 such as a home office, an office space, a public space, and other specific areas where the user 102 may utilize or has utilized the computing device 104. In one example, the CSI data provided by the wireless sensing device 124 to the CMFA device 110 may include an environment fingerprint or profile that identifies a specific environment 200 in which the computing device 104 is being operated.

Further, the wireless sensing device 124 may detect the present of non-stationary elements within the environment 200 such as individuals including the user 102 and other individuals who are not the user, moving appliances such as ceiling fans or autonomous robotic vacuum cleaners, animals other than humans such as pets, and other moving elements within the environment 200. Further, the wireless sensing device 124 may detect the relative locations of all these non-stationary elements within the environment 200 of the computing device 104 with respect to one another and on a continuous basis. Further, the wireless sensing device 124 may be capable of identifying specific individuals including the user 102 and other individuals who may be classified as non-user(s) and may do so by examining a gate of the user 102 and non-user(s), relative sizes of these individuals, and/or other characteristics of these individuals.

The wireless sensing device 124 may include any number of omni-directional antenna. Through the use of the omni-directional antenna, the wireless sensing device 124 may be capable of detecting objects in a 360 degree field of view and/or a three-dimensional field of view within the environment 200 in which the computing device 104 is located. The wireless sensing device 124 may detect objects within that 360 degree and/or a three-dimensional field of view. As computing devices within the CMFA system 100 such as the computing device 104 being operated by the user 102 send wireless signals within a network, a number of frames of that wireless signal may be detected by the wireless sensing device 124 of the network device(s) 108. The media access control (MAC) layer structure (e.g., the data link layer) of that signal may include a number of detectable electromagnetic properties as it is detected by one or more antennas of the wireless sensing device 124. The amplitude (e.g., strength) of the wireless signal and the angle at which the wireless signal is received may be measured.

The wireless sensing device 124 may compile the data defining the CSI into a number of CSI measurement reports. Further, in one example, the wireless sensing device 124 and/or the computing device 104 may instruct other networked computing devices such as access points, other user computing devices, etc. to perform wireless sensing operations (e.g., CSI measurements) and report data defining the CSI measurements to the computing device 104, the network device(s) 108, the wireless sensing device 124, the CMFA device 110, and combinations thereof.

In one example, the wireless sensing device 124 may be included within the network device(s) 108 that are in the same radio frequency (RF) environment 200 as the computing device 104. In one example, the computing device 104 and/or the network device(s) 108 may select a number of the network device(s) 108 that are within that RF environment 200. More details regarding the interaction between the computing device 104 and the network device(s) 108 and wireless sensing device 124 of the network device(s) 108 is described herein.

The CSI data and measurements, the biometric data, the behavioral data, and/or the contextual data may be used by the IDActivKey generator 112, to generate a unique IDActivKey corresponding to the application provider(s) 120. In one example, the behavioral data and contextual data may be utilized in the creation of the IDActivKey, or at a minimum, may be used as thresholds to ensure that the context of the computing device 104 and user 102 are acceptable as specified by a policy of the application provider(s) 120.

The CSI data, behavioral data, and/or the contextual data may be fed into a fusion engine 126. The fusion engine 126 may, through a number of processes and/or algorithms, combine the CSI data, behavioral data, and/or the contextual data to obtain a set of data that may be used to create a trust score. In the examples described herein, the fusion engine 126 may be enhanced to consider environment sensing data such as the CSI data obtained from the wireless sensing device 124. In this manner, the CSI data may become part of the analysis when determining a trust score associated with the use of the computing device 104 by the user 102 within the environment 200. In one example, the CSI data may be utilized by the CMFA device 110 including the fusion engine 126 and the trust score generator 114 to determine access, authorization, and levels of access to the computing device 104 and/or the application(s) 106 and application provider(s) 120.

The CSI data, behavioral data, and/or the contextual data may also be used by a trust score generator 114, which may generate a trust score as a measure of confidence in the authentication of user 102 and that the authenticated user 102 is still present and operating the computing device 104 in an acceptable manner as specified by a policy of the application provider(s) 120.

The CMFA device 110 may include hardware, software, and combinations thereof. Further, the CMFA device 110 may be a mobile device, a personal computer or other computing device. Still further, the CMFA device 110 may or may not be included within or be the same device as the computing device 104. In one example, the CMFA device 110 may include secure hardware such as a trust platform module 122 in combination with a CMFA application 116 and the IDActivKey generator 112 that may work together to generate IDActivKeys and ensure compliance with application or service provider policies. In one example, the application provider(s) 120 may be accessed through and the application(s) 106 on the computing device 104. In one example, the application(s) 106 may be any number of applications that are specifically for accessing a number of application provider(s) 120 or may be a more general application, which may access multiple services, such as a web browser, or portions of an operating system among other computing resources and/or services.

The IDActivKey generator 112 may collect the CSI data from the network device(s) 108 once the computing device 104 sends a wireless sensing request to the network device(s) 108. The network device(s) 108 may instruct the wireless sensing device 124 and, potentially, other devices to collect the CSI data and transmit the CSI data to the IDActivKey generator 112. Further, the IDActivKey generator 112 may collect the biometrics from the user 102 at the computing device 104. These biometrics may include, for example, fingerprint data, facial detection data, retinal scan data, voice identification data, gait data, and/or other types of biometrics. For the application provider(s) 120, a cryptographic seed from a pseudo-arbitrary number generator in the trust platform module 122 may be used to select a sampling of the CSI data and/or the biometric data to be used as an IDActivKey for the application in question. In one example, the IDActivKey may only be derived when the CMFA device 110 determines that certain CSI, behavioral, and/or contextual requirements indicate compliance with a policy. In one example, a "master" IDActivKey may exist that is used to gain access to the trust authentication provider 118.

In one example, trusted computing implementations, such as the trust platform module 122, may rely on roots of trust. Roots of trust may provide assurances that the root has been implemented in a way that renders it trustworthy. A certificate may identify the manufacturer and evaluated assurance level (EAL) of the trust platform module 122. Such certification may provide a level of confidence in the roots of trust used in the trust platform module 122. Moreover, a certificate from a platform manufacturer may provide assurance that the trust platform module 122 was properly installed on a system that is compliant with specific requirements so the root of trust provided by the platform may be trusted. Some implementations may rely on three roots of trust in a trusted platform, including roots of trust for measurement (RTM), storage (RTS), and reporting (RTR).

The trust score generator 114 may detect the CSI data and the behavioral and contextual data from user 102, the surrounding environment 200, or other sources. For example, location information could be derived from the network that the computing device 104 is connected to. These data may include information about location of the computing device 104, presence of the user 102 with respect to the computing device, the location of the user 102 and/or the computing device 104 within an environment 200, the movement of objects (e.g., individuals) within the environment 200, the location of stationary objects (e.g., walls, furniture, doors, windows, etc.) within the environment 200, movement of the computing device 104 and/or user 102, device behavior and other CSI data and behavior and context data. From this data, the trust score generator 114 may generate a trust score which reflects a confidence level that the user 102 is in compliance with a policy specified by the application provider(s) 120. This includes the confidence that user 102 is the person operating the current session executed on the computing device 104. In one example, one or more of the IDActivKey generator 112, the trust platform module 122, and trust score generator 114 may be located in a physically separate and secure portion of the CMFA device 110.

In response to a service request from the application(s) 106 on the computing device 104, the application provider(s) 120 may request authentication of an identity of the user 102 through the trust authentication provider 118. The trust authentication provider 118 may store information about the access requirements for the application provider(s) 120 and request an IDActivKey and trust score from the CMFA device 110 in response to an authentication request. Upon receiving an IDActivKey and a trust score, the trust authentication provider 118 may use this information in tandem with the access requirements received from the application provider(s) 120 to authenticate a session with the application provider(s) 120 on behalf of the application provider(s) 120.

The trust authentication provider 118 may request updated IDActivKeys and trust scores at different intervals depending on the requirements specified by the access policies defined by the application provider(s) 120 and may send new access policies in response to new information during a session. The trust authentication provider 118 may also shield private information from the application provider(s) 120, providing authentication without revealing information such as birth dates, social security numbers, or marital status, etc. In one example, the trust authentication provider 118 may need only inform the application provider(s) 120 that access should be granted, while in some embodiments the trust authentication provider 118 may also send the IDActivKey for the service to the application provider(s) 120.

While FIG. 1 only illustrates one application 106 and one application provider 120, in one example, any number of applications 106 and/or application provider(s) 120 may be included and processed in the manner described herein. Each of the application provider(s) 120 may have its own access policy, and any IDActivKey will be unique to each respective the application provider(s) 120.

With the understanding above regarding the manner in which CMFA may take place, an example as to how the CSI data may be used to continuously authenticate and adjust authorization of the user 102 with respect to the computing device 104 and/or the application provider(s) 120. The CSI data obtained from the wireless sensing request sent to the network device(s) 108 and accomplished via the wireless sensing device 124 may be used to augment the attributes of user identity posture and the trust score by monitoring the environment 200 around an already authenticated user 102 through the wireless-based factors described herein. The wireless sensing device 124 may utilize any of a myriad of radio technologies and their respective frequencies, amplitudes, phases, and other radio-based parameters to allow for CSI measurements to be performed and resulting CSI data to be obtained. In one example, the wireless sensing device 124 may utilize the IEEE 802.11bf wireless local area network (WLAN) standard, ultra-wideband (UWB) radio technologies, Bluetooth® low energy (BLE), etc., and combinations thereof since many computing devices such as personal computing devices, mobile phones, tablets computing devices, etc. already include such wireless technologies.

Thus, as the computing device 104, the network device(s) 108, or other computing device within the CMFA system 100 send wireless signals, a MAC layer structure of the wireless signal may exhibit a number of electromagnetic characteristics which may be referred to as tones. For each tone, the wireless sensing device 124 and other wireless sensing device 124 associated with other computing devices within the CMFA system 100, a strength of the signal (e.g., amplitude) and an angle at which a signal is received may be measured. The combination of this amplitude and angle of the signal may define the CSI for the signal. In the context of the IEEE 802.11bf wireless standard, this type of information obtained for the CSI is unused in most applications unless there is information an individual wishes to obtain between the network device(s) 108 (e.g., and access point (AP) and the computing device 104. For example, if a user 102 wishes to send a frame of the signal to multiple clients (e.g., multi-user multiple-input and multiple-output (MU-MIMO) which is a set of multiple-input and multiple-output (MIMO) technologies for multipath wireless communication in which multiple users or terminals, each radioing over one or more antennas, communicate with one another), then a number of stations such as a number of network device(s) 108 and the computing device 104 that are in the same radio frequency (RF) environment 200 or network may be selected. In order to achieve this, the network device(s) 108 and/or the computing device 104 may perform a sounding operation in which the network device(s) 108 and/or the computing device 104 receive a special frame of the signal, identifies that special frame as a sounding frame, records the CSI for that sounding frame, and sends a response to the sounding frame back to the network device(s) 108 indicating results of the sounding frame and how the computing device 104 received the tones (e.g., amplitudes and angles).

In order to utilize wireless sensing data via the CSI processes described herein, the user 102 may be authenticated as to the CMFA system 100, a network, and/or the computing device 104 through an authentication process such as multi-factor authentication. This initial authentication may include utilizing the CMFA device 110 to perform MFA or CMFA processing.

The authentication of the user 102 as to the CMFA system 100, a network, and/or the computing device 104 may cause the wireless sensing assisted CMFA processes described herein. In one example, authentication of the user 102 as to the CMFA system 100, a network, and/or the computing device 104 may trigger the wireless sensing device 124 of the network device(s) 108 and may be instructed to do so through a CMFA application 116 executed on the computing device 104 or separate from the computing device 104. In one example, the CMFA device 110 may receive instructions from the computing device 104 to execute the CMFA processes based at least in part on the authentication of the user 102 as to the CMFA system 100, a network, and/or the computing device 104. Further, the computing device 104 may utilize any 802.11bf standard-defined sensing setup and measurement processes and mechanisms to initiate sensing and measuring of the CSI changes in the environment 200. The 802.11bf standard-defined sensing setup and measurement processes and mechanisms may include any existing and/or future 802.11bf standards. The wireless sensing device 124 along with corresponding RF devices within eh computing device 104 may be used in measuring the changes in the wireless signal patterns within an environment 200 in which the computing device 104 and the user 102 are located.

The network device(s) 108 with the wireless sensing device 124 may receive a wireless sensing request from the computing device 104 and the computing device 104 and/or the network device(s) 108 may obtain or collect data defining CSI changes in the wireless signal patterns in the environment 200 in which the computing device 104 and/or the CMFA system 100 as a whole operates. In one example, the CSI data may be presented as or incorporated into a CSI measurement report for use by the CMFA device 110 in continuously performing MFA (e.g., CMFA) and adjusting access by the user 102 to the computing device 104 and/or one or more application(s) 106 executed thereon. In this manner, rather than simply identifying trust or authentication, the present systems and methods provide for authorization levels that adapt or are adjustable based on a generated trust score. Wireless sensing and CSI generation performed by the wireless sensing device 124 of the network device(s) 108 may detect both static elements within the environment 200 as well as motion near the user 102 such as in front, behind, and to the sides of the user 102 and the computing device 104. Further, the wireless sensing device 124 of the network device(s) 108 may also detect if the user 102 is present and may do so even if the user 102 not in the camera field. Increase of activity in the environment 200 where the user 102 is operating the computing device 104 directly affects its trust score.

For example, in a situation were the user 102 is operating the computing device 104 working in a public environment 200 such as a restaurant there may exist no other individuals in the environment 200 or there may exist heavy activity and/or a number of individuals sitting, standing, or moving behind the user 102. In the first situation where there are no other individuals, the trust score for the authorization level of the user 102 as defined by the trust authentication provider 118 and the trust score generator 114 of the CMFA device 110 may be relatively higher compared to the situation where a number of individuals are present in the environment 200 of the user 102 and the computing device 104 with all other factors being equal. Similarly, the trust score may drop if and when the user 102 is no longer detected near the computing device 104 and especially while other individuals are detected near the computing device 104.

Further, the trust score may then determine the changes in the access policy for a service or resource provided by the application provider(s) 120 and the application(s) 106. Thus, the wireless sensing device 124 of the network device(s) 108 may assist in providing a continuously up-to-date and accurate trust score since the CSI data obtained from the wireless sensing device 124 may signal if an individual other than the user 102 is eavesdropping or secretly watching the user 102 and/or the operation of the computing device 104. Since the presence of individuals other than the user 102 around the computing device 104 may increase the risk of those individuals compromising the security of data and information on the computing device, the ability of the wireless sensing device 124 to detect stationary objects (e.g., walls of a room, pillars, tables, chairs, etc.) and non-stationary objects (e.g., individuals other than the user 102) allows the present systems and methods to continuously and dynamically adjust authorization and access to the computing device 104 and application(s) 106 and application provider(s) 120.

The computing device 104 and/or the CMFA device 110 may collect the CSI measurement reports form the network device(s) 108 and the wireless sensing device 124. Further, in one example, the computing device 104 may also request the network device(s) 108 (e.g., and access point (AP)) and other network device(s) 108 to perform the wireless sensing (e.g., CSI measurements) and report the measurement data to the computing device 104 and/or the CMFA device 110.

The CSI data provided by the wireless sensing device 124 as the CSI measurement reports may include long-term cycles (e.g., statistical CSI) and short-term cycles (e.g., instantaneous CSI). In one example, the stochasticity for the CSI data may be minimized to obtain a more effective result in the CSI data. The long-term cycles (e.g., statistical CSI) may indicate that a statistical characterization of the wireless channel is known. The description associated with the long-term cycles (e.g., statistical CSI) may include, for example, a type of fading distribution, an average channel gain, a line-of-sight component, and a spatial correlation component. The long-term cycles (e.g., statistical CSI) may match an effect of multipath signals on static elements (e.g., walls of a room, pillars and other structural elements of a building, tables, chairs, appliances, ceilings, floors, windows, decorative plants, and other stationary elements within an environment 200) that create reflections on these static elements leading to the ability to identify those static elements. As the signal reflects on these various static obstacles, the signal follows a changing pattern that at least partially repeats over time. These repetitions are identifiable and reflect the structure of the environment 200.

Short-term cycles (e.g., instantaneous CSI) may mean that the current channel conditions are known, which may be viewed as knowing the impulse response of a digital filter. This gives an opportunity to adapt the transmitted signal to the impulse response and thereby optimize the received signal for spatial multiplexing or to achieve low bit error rates. Thus, the short-term cycles (e.g., instantaneous CSI) may match movements in the environment 200 (e.g., a person walking within the environment 200 of the computing device 104, etc.). The short-term cycles (e.g., instantaneous CSI) are identifiable and distinguishable from the long-term cycles (e.g., statistical CSI) because they are relatively temporarily shorter and because their incidence on the phase of the CSI is measurable to represent the direction of movement. In this manner the general structure and static elements of the environment 200 including the general position of the detecting device in a room may be achieved through the use of the long-term cycles (e.g., statistical CSI), and changes in the environment 200 such as one or more individuals entering the environment 200, moving within the environment 200, and/or leaving the environment 200 may be detected using the short-term cycles (e.g., instantaneous CSI) cycles.

The collected CSI data may be packaged or embodied in a CSI measurement report and may be sent to the CMFA device 110. In one example, the CSI data may be sent to the CMFA device 110 on a periodic basis such as, for example, every N minutes. In one example, the CSI data may be sent to the CMFA device 110 on a continuous basis. In one example, the CSI data may be sent to the CMFA device 110 based at least in part on an instance when there are significant changes in the environment 200 as determined by processing of CSI data by the wireless sensing device 124 of the network device(s) 108 and/or the computing device 104.

The CSI measurement reports created from the CSI data obtained from and reported by the wireless sensing device 124 may be fed into the fusion engine 126 which has been enhanced to consider environment sensing data including the CSI data as described herein. The CSI data may identify the kind of environment 200 the user 102 is operating the computing device 104 and/or an exact location the user 102 is operating the computing device 104 based on a fingerprint or profile that identifies a specific environment 200 in which the computing device 104 is being operated. In an example where the user 102 is in an environment 200 with a individuals other than the user 102 moving within the environment 200 such as at a restaurant or café. In this example, there may be significant changes in the CSI data and associated metrics compared with an example where the user 102 is operating the computing device 104 alone at a home office or in their work office where a significantly fewer number of changes within the environment 200 may occur.

In these examples of location detection, the computing device 104 may not be required to report its location using, for example, GPS location data or similar methods. This greatly increases the level of security for the user 102 and the computing device 104 since no entity may necessarily know where the user 102 is operating the computing device 104. Instead, the CMFA system 100 may use the CSI data to serve as a proxy for location and/or location density. Thus, a CSI profile that keeps repeating a number of days may be indicative of the work environment 200 of the user 102 (e.g., at their home office, at a public space, at an office desk, etc.). Thus, full trust and access to all resources including the application(s) 106, application provider(s) 120, and/or the computing device 104 may be provided since the CMFA system 100 knows whether the environment 200 in which the user 102 is operating the computing device 104 is relatively secure.

In contrast, in an example where a CSI profile is indicative of a relatively higher density of individuals within the environment 200 and/or relatively more individuals and/or activity behind the user 102, the CMFA device 110 may limit user access to including the application(s) 106, application provider(s) 120, and/or the computing device 104 or nay relatively higher-sensitivity material. Further, the detection of a relatively higher density of individuals within the environment 200 and/or relatively more individuals and/or activity within the environment 200 while the user 102 is not detected at the computing device 104 (e.g., not detected in front of the computing device 104) may cause a drop in the trust score as defined by the trust score generator 114 of the CMFA device 110.

In one example, millimeter wave (mmWave) sensing may be employed by the wireless sensing device 124 of the network device(s) 108 and/or the computing device 104 to obtain the CSI data and other information regarding the environment 200 in which the user 102 is operating the computing device 104. This mmWave sensing technology may include any 802.11ay standards or equivalent and may be considered as a special class of radar technology that uses short-wavelength electromagnetic waves. Radar systems included in, for example, the wireless sensing device 124 of the network device(s) 108 and/or the computing device 104 may transmit electromagnetic wave signals that objects in their path then reflect. By capturing the reflected signal, a radar system may determine the range, velocity, and angle of the objects within the environment 200 as described herein. mmWave radars transmit signals with a wavelength that is in the millimeter range which may be considered as a short wavelength in the electromagnetic spectrum. The size of system components such as the antennas required to process mmWave signals may be relatively smaller than the components associated with the IEEE 802.11bf wireless systems described herein. An advantage of the short wavelengths provided by the mmWave sensing technology may include a high accuracy where an mmWave system operating at 76-81 GHz (with a corresponding wavelength of about 4 mm), may have the ability to detect movements that are as small as a fraction of a millimeter. A mmWave radar system may include transmit (TX) and receive (RX) RF components included within the wireless sensing device 124 of the network device(s) 108 and/or the computing device 104. Further, analog components such as clocking; and digital components such as analog-to-digital converters (ADCs), microcontrollers (MCUs) and digital signal processors (DSPs) may also be included within the mmWave radar system. In one example, the mmWave technology may include frequency-modulated continuous wave (FMCW) technologies where the FMCW radar may transmit a frequency-modulated signal continuously in order to measure range as well as angle and velocity. This may differ from pulsed-radar systems, which transmit short pulses periodically.

In one example, baseline CSI data may be established at the outset of the use of the computing device 104 by the user 102, at periodic intervals throughout the use, in instances as instructed by the user 102, or at other intervals and instances. As the CSI data collected from the wireless sensing device 124 changes from the baseline CSI data, the CMFA device 110 may make changes tot eh trust score, and as changes to the trust score occur, authorization by the computing device 104 as to the user 102 and/or access to the application(s) 106 and/or application provider(s) 120 may also occur. Thus, as changes tot eh CSI data changes from the baseline CSI data or otherwise, changes in authorization and/or access may be triggered.

In one example, N number of profiles for different locations may be created via the CMFA system 100, and each of the profiles may include M number of variations of those environments 200 where new individuals or other non-stationary objects are present in the environment 200 or where stationary objects in the environment 200 are changed. The profiles may be stored in the CMFA device 110, the network device(s) 108, the computing device 104, or other device within the CMFA system 100 as profiles and variance profiles.

Further, as described herein, a number of policies may be formulated to define the use of the computing device 104 by the user 102 in various environments 200 and to define access to resources of the application(s) 106 and/or application provider(s) 120. An administrator and/or the user 102 may determine a number of policies associated with the execution of the processes described herein. For example, these policies may define how often authorization as to the computing device 104 is performed and/or how often reevaluation of access to the resources of the computing device 104, the application(s) 106, and/or the application provider(s) 120 is performed. In one example, the policies may define what profiles of environments 200 are acceptable such as defining a home office or other office space with a known profile an acceptable environment 200 to operate the computing device 104 and/or defining a public space (even a known public space) as a regulated environment 200 to operate the computing device 104 and restricting access to resources of the computing device 104, the application(s) 106, and/or the application provider(s) 120.

Figure 3:
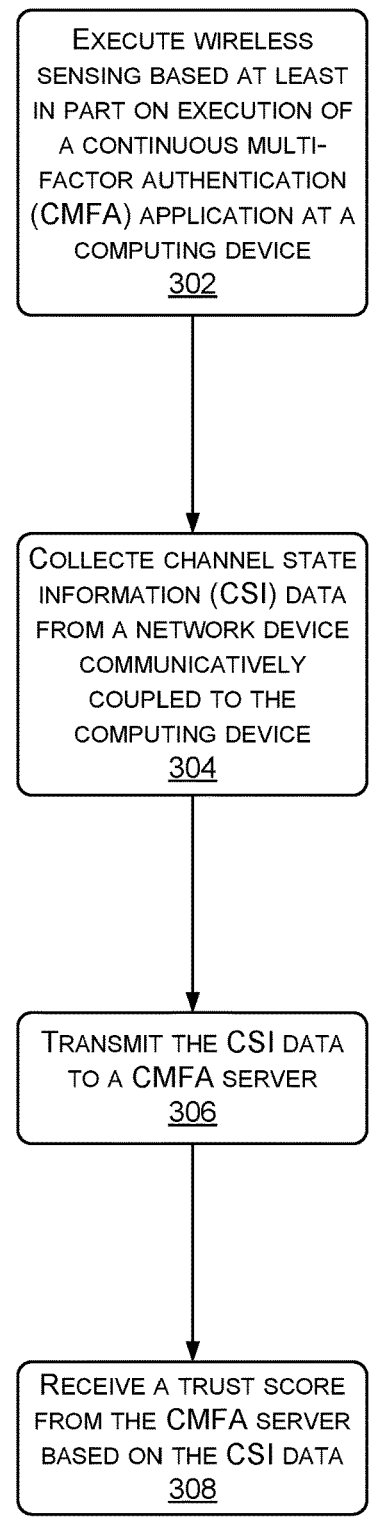
FIG. 3 illustrates a flow diagram of an example method for continuous multi-factor authentication (CMFA), according to an example of the principles described herein.
Figure 4:
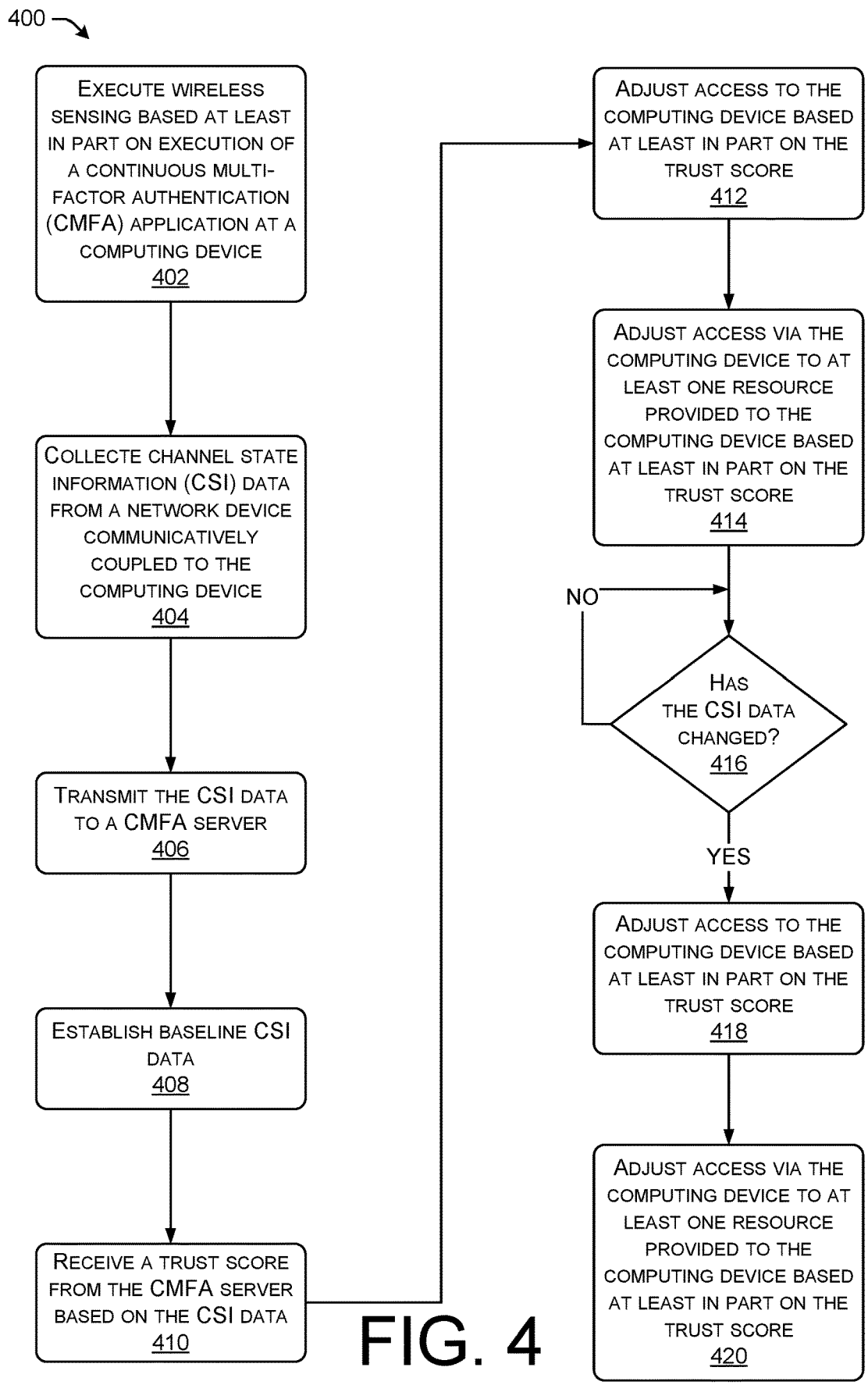
FIG. 4 illustrates a flow diagram of an example method for continuous multi-factor authentication (CMFA), according to an example of the principles described herein.

FIGS. 3 and 4 illustrate flow diagrams of example methods 300 and 400 and that illustrate aspects of the functions performed at least partly by the CMFA system 100, the computing device 104, the network device(s) 108, the wireless sensing device 124, the CMFA device 110, the trust authentication provider 118, the application(s) 106, and/or the application provider(s) 120 as described in FIG. 1. The logical operations described herein with respect to FIGS. 3 and 4 may be implemented (1) as a sequence of computer-implemented acts or program modules running on a computing system and/or (2) as interconnected machine logic circuits or circuit modules within the computing system. In some examples, the method(s) 300 and 400 may be performed by a system comprising one or more processors and one or more non-transitory computer-readable media storing computer-executable instructions that, when executed by the one or more processors, cause the one or more processors to perform the method(s) 300 and 400.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 3-X and described herein. These operations may also be performed in parallel, or in a different order than those described herein. Some or all of these operations may also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for continuous multi-factor authentication (CMFA), according to an example of the principles described herein. The method 300 may include, at 302, executing wireless sensing based at least in part on execution of a continuous multi-factor authentication (CMFA) application at the computing device 104. Here, a user 102 may instruct the computing device 104 to execute the application(s) 106 and seek for resources from the application(s) 106 and/or the application provider(s) 120. By so doing, the computing device 104 may trigger the wireless sensing request to the wireless sensing device 124 of the network device(s) 108 to produce the CSI data for consumption by the CMFA device 110. Further, in one example, the mere use of the computing device 104 by the user 102 may trigger the CMFA device 110 to begin an MFA and/or CMFA process in an initial instance and continue the CMFA processes described herein.

At 304, the CSI data may be collected from the network device 108 communicatively coupled to the computing device 104. As described herein, the collection of the CSI data may be made by the network device(s) 108 and/or CMFA device 110 and may be embodied as CSI measurement reports. At 306, the CSI data may be transmitted to the CMFA device 110, and specifically, the fusion engine 126 and the trust score generator 114 to begin the process of obtaining a trust score for the CSI data biometric, behavioral, and contextual data. The computing device 104, the application(s) 106, and/or application provider(s) 120 may receive a trust score from the CMFA device 110 at 308. In this manner, the trust score obtained from the CMFA device 110 may be based at least in part on the CSI data.

FIG. 4 illustrates a flow diagram of an example method 400 for continuous multi-factor authentication (CMFA), according to an example of the principles described herein. The method 400 may include, at 402, executing wireless sensing based at least in part on execution of a continuous multi-factor authentication (CMFA) application at the computing device 104. Here, a user 102 may instruct the computing device 104 to execute the application(s) 106 and seek for resources from the application(s) 106 and/or the application provider(s) 120. By so doing, the computing device 104 may trigger the wireless sensing request to the wireless sensing device 124 of the network device(s) 108 to produce the CSI data for consumption by the CMFA device 110. Further, in one example, the mere use of the computing device 104 by the user 102 may trigger the CMFA device 110 to begin an MFA and/or CMFA process in an initial instance and continue the CMFA processes described herein.

At 404, the CSI data may be collected from the network device 108 communicatively coupled to the computing device 104. As described herein, the collection of the CSI data may be made by the network device(s) 108 and/or CMFA device 110 and may be embodied as CSI measurement reports. At 406, the CSI data may be transmitted to the CMFA device 110, and specifically, the fusion engine 126 and the trust score generator 114 to begin the process of obtaining a trust score for the CSI data biometric, behavioral, and contextual data.

At 408, baseline CSI data may be established by the computing device 104, the network device, and/or the CMFA device 110 and used to compare all other CSI data measurements to the baseline CSI data to determine if changes to the CSI data has occurred. For example, the CSI data may change in instances where the computing device 104 is being operated in a different environment, when non-stationary objects such as individuals 214 other than the user 102 are detected in the environment 200, or other changes in the environment described herein.

The computing device 104, the application(s) 106, and/or application provider(s) 120 may receive a trust score from the CMFA device 110 at 410. In this manner, the trust score obtained from the CMFA device 110 may be based at least in part on the CSI data.

Further, at 412, access to the computing device 104 may be adjusted based at least in part on the trust score obtained from the CMFA device 110. For example, in instances where the user 102 is not present in the environment 200, access to the computing device 104 may be entirely restricted in order to maintain security as to the computing device 104. Further, in instances where other individuals are present in the environment 200 along with the user 102, access may be reduced or eliminated to ensure that eavesdropping does not occur.

At 414, the method 400 may further include adjusting access via the computing device 104 to at least one resource provided to the computing device 104 such as those provided via the application(s) 106 and/or the application provider(s) 120. This may be based at least in part on the trust score obtained from the CMFA device 110 or updated by the CMFA device 110. For example, access and/or authorization to view certain documents, databases, other data, etc. via the computing device 104 may be restricted or eliminated based on the trust score which may be a reflection of one or more changes to the environment in which the user 102 is operating the computing device 104.

At 416, the CMFA system 100 may determine if the CSI data obtained from the wireless sensing device 124 has changed. For example, a second or a continuous sensing instance may indicate that the CSI data has changed from a baseline or has changed from any previous CSI measurement report. Thus, the trust score as calculated by the CMFA device 110 may also change resulting in a change in authorization and/or access to the computing device 104. Based on a determination that the CSI data has not changed (414, determination NO), the process may loop back to 416, and the CMFA system 100 may periodically or continually determine if e CSI data obtained from the wireless sensing device 124 has changed.

However, if the CSI data has changed (414 determination YES), then the trust score may be adjusted based at least in part on the CSI data having changed to define an updated trust score. Furthermore, at 418, access to the computing device 104 may be adjusted based at least in part on the trust score changing, and at 420 access via the computing device 104 to at least one resource provided to the computing device 104 may be adjusted based at least in part on the updated trust score.

In the examples described herein, the processes of obtaining and processing the CSI data may occur at intervals such as once every N minutes or may occur on a continuous basis. In these examples, an administrator and/or the user 102 may define the frequency at which the CSI data is measured and reported. Further, in the examples described herein, an administrator and/or the user 102 may define the policies leading to changes in access and/or authorization based at least in part on the trust score determined by the CMFA device 110.

Figure 5:
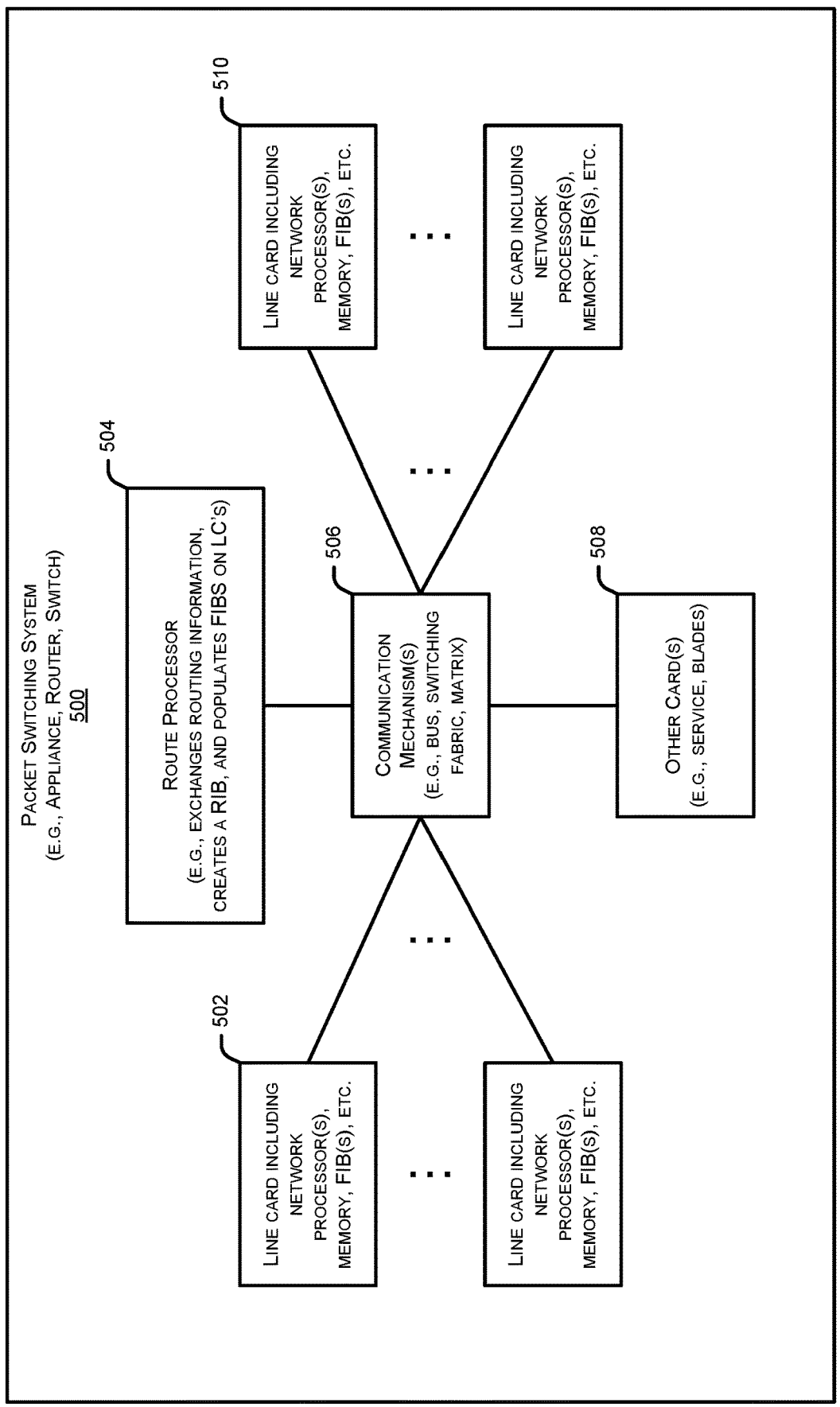
FIG. 5 illustrates a block diagram illustrating an example packet switching system that may be utilized to implement various aspects of the technologies disclosed herein.

FIG. 5 illustrates a block diagram illustrating an example packet switching system (or device) 500 that may be utilized to implement various aspects of the technologies disclosed herein. In some examples, the packet switching system 500 may be employed in various networks, such as, for example, network embodied by the CMFA system 100 as described with respect to FIG. 1.

In some examples, a packet switching system 500 may comprise multiple line card(s) 502, 510, each with one or more network interfaces for sending and receiving packets over communications links (e.g., possibly part of a link aggregation group). The packet switching system 500 may also have a control plane with one or more processing elements 505 for managing the control plane and/or control plane processing of packets associated with forwarding of packets in a network. The packet switching system 500 may also include other cards 508 (e.g., service cards, blades) which include processing elements that are used to process (e.g., forward/send, drop, manipulate, change, modify, receive, create, duplicate, apply a service) packets associated with forwarding of packets in a network. The packet switching system 500 may comprise hardware-based communication mechanism 506 (e.g., bus, switching fabric, and/or matrix, etc.) for allowing its different entities 502, 504, 508 and 510 to communicate. Line card(s) 502, 510 may typically perform the actions of being both an ingress and/or an egress line card 502, 510, in regard to multiple other particular packets and/or packet streams being received by, or sent from, packet switching system 500.

Figure 6:
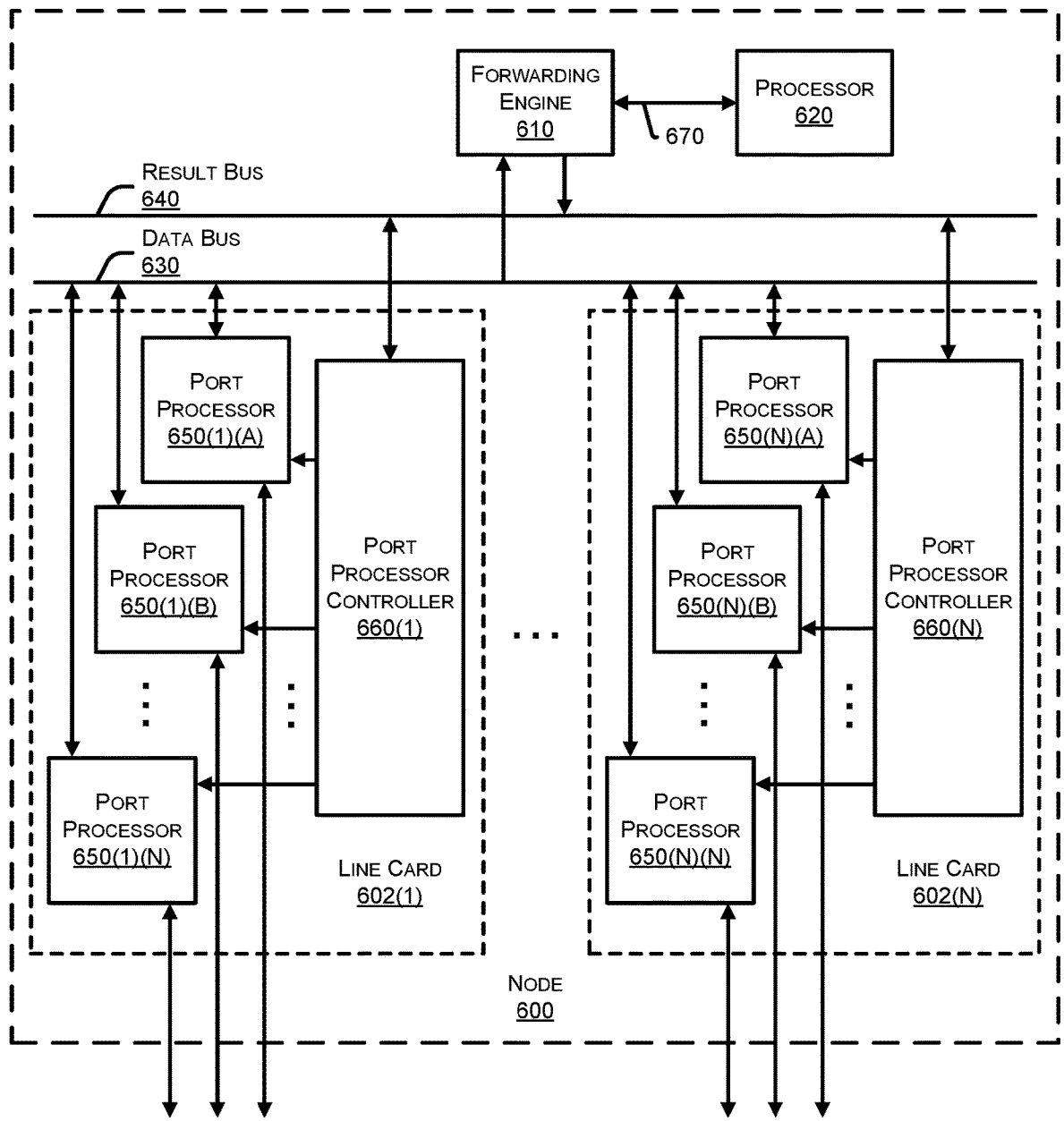
FIG. 6 illustrates a block diagram illustrating certain components of an example node that may be utilized to implement various aspects of the technologies disclosed herein.

FIG. 6 illustrates a block diagram illustrating certain components of an example node 600 that may be utilized to implement various aspects of the technologies disclosed herein. In some examples, node(s) 600 may be employed in various networks, such as, for example, the network embodied by the CMFA system 100 as described with respect to FIG. 1.

In some examples, node 600 may include any number of line cards 602 (e.g., line cards 602(1)-(N), where N may be any integer greater than 1) that are communicatively coupled to a forwarding engine 610 (also referred to as a packet forwarder) and/or a processor 620 via a data bus 630 and/or a result bus 640. Line cards 602(1)-(N) may include any number of port processors 650(1)(A)-(N)(N) which are controlled by port processor controllers 660(1)-(N), where N may be any integer greater than 1. Additionally, or alternatively, forwarding engine 610 and/or processor 620 are not only coupled to one another via the data bus 630 and the result bus 640, but may also communicatively coupled to one another by a communications link 670.

The processors (e.g., the port processor(s) 650 and/or the port processor controller(s) 660) of each line card 602 may be mounted on a single printed circuit board. When a packet or packet and header are received, the packet or packet and header may be identified and analyzed by node 600 (also referred to herein as a router) in the following manner. Upon receipt, a packet (or some or all of its control information) or packet and header may be sent from one of port processor(s) 650(1)(A)-(N)(N) at which the packet or packet and header was received and to one or more of those devices coupled to the data bus 630 (e.g., others of the port processor(s) 650(1)(A)-(N)(N), the forwarding engine 610 and/or the processor 620). Handling of the packet or packet and header may be determined, for example, by the forwarding engine 610. For example, the forwarding engine 610 may determine that the packet or packet and header should be forwarded to one or more of port processors 650(1)(A)-(N)(N). This may be accomplished by indicating to corresponding one(s) of port processor controllers 660 (1)-(N) that the copy of the packet or packet and header held in the given one(s) of port processor(s) 650(1)(A)-(N)(N) should be forwarded to the appropriate one of port processor (s) 650(1)(A)-(N)(N). Additionally, or alternatively, once a packet or packet and header has been identified for processing, the forwarding engine 610, the processor 620, and/or the like may be used to process the packet or packet and header in some manner and/or maty add packet security information in order to secure the packet. On a node 600 sourcing such a packet or packet and header, this processing may include, for example, encryption of some or all of the packets or packet and header information, the addition of a digital signature, and/or some other information and/or processing capable of securing the packet or packet and header. On a node 600 receiving such a processed packet or packet and header, the corresponding process may be performed to recover or validate the packets or packet and header information that has been secured.

Figure 7:
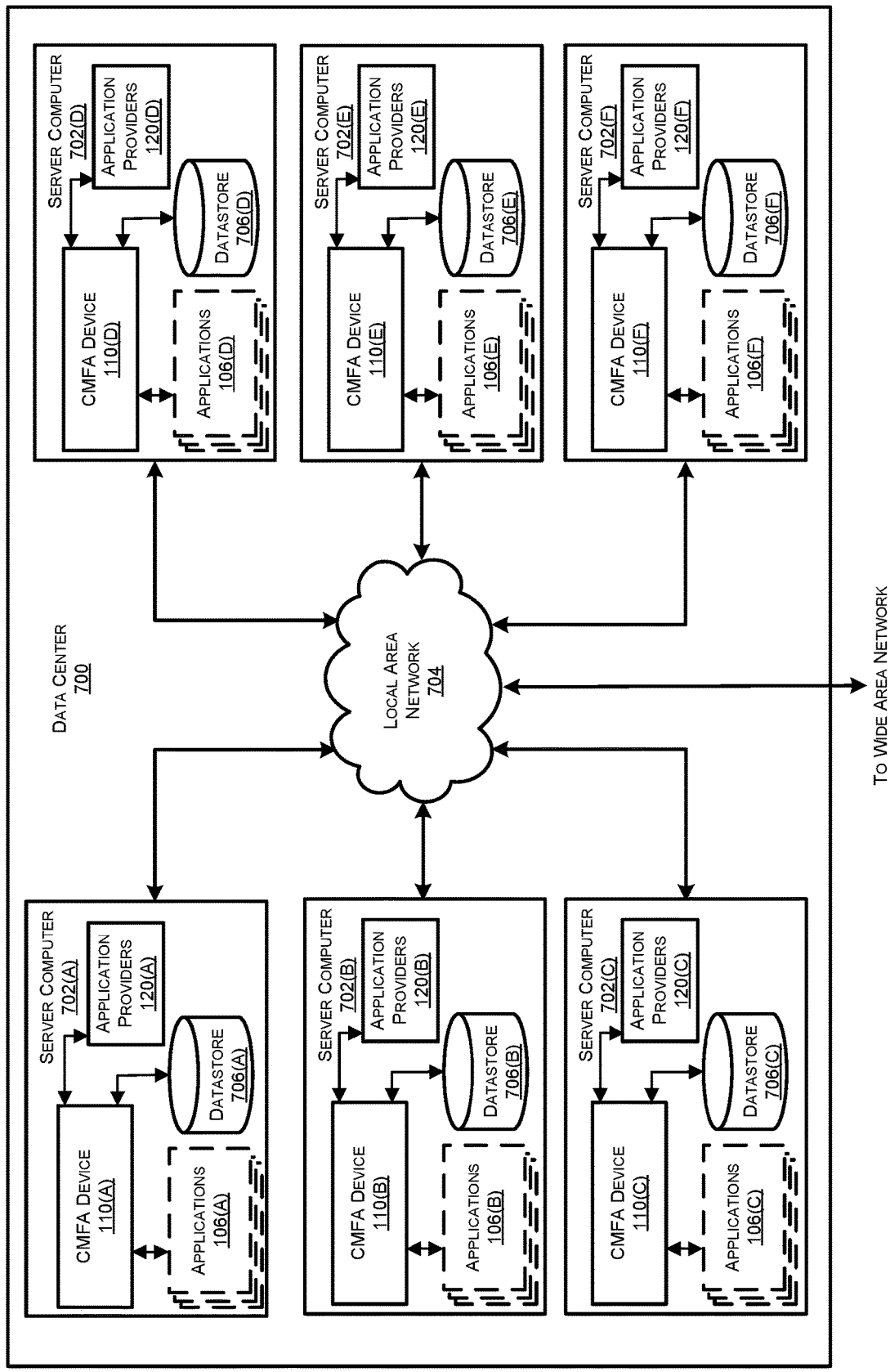
FIG. 7 illustrates a computing system diagram illustrating a configuration for a data center that may be utilized to implement aspects of the technologies disclosed herein.

FIG. 7 is a computing system diagram illustrating a configuration for a data center 700 that may be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the server computers 702 may include, or correspond to, the servers associated with the CMFA system 100, the CMFA device 110, the trust authentication provider 118, and/or the application provider(s) 120 described herein with respect to FIGS. 1 through 4.

The server computers 702 may be standard tower, rack-mount, or blade server computers configured appropriately for providing the computing resources described herein. As mentioned above, the computing resources provided by the CMFA system 100, the CMFA device 110, the trust authentication provider 118, and/or the application provider(s) 120 may be data processing resources such as VM instances or hardware computing systems, database clusters, computing clusters, storage clusters, data storage resources, database resources, networking resources, and others. Some of the servers 702 may also be configured to execute a resource manager capable of instantiating and/or managing the computing resources. In the case of VM instances, for example, the resource manager may be a hypervisor or another type of program configured to enable the execution of multiple VM instances on a single server computer 702. Server computers 702 in the data center 700 may also be configured to provide network services and other types of services.

In the example data center 700 shown in FIG. 7, an appropriate LAN 704 is also utilized to interconnect the server computers 702A-702F. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations may be utilized.

In some examples, the server computers 702 may each execute a CMFA device 110, one or more applications 106, one or more datastore(s) 706, and/or one or more application providers 120.

In some instances, the server computers 702 may provide computing resources, like application containers, VM instances, and storage, on a permanent or an as-needed basis. Among other types of functionality, the computing resources provided by the CMFA system 100, the CMFA device 110, the trust authentication provider 118, and/or the application provider(s) 120 may be utilized to implement the various services described above. The computing resources provided by the CMFA system 100, the CMFA device 110, the trust authentication provider 118, and/or the application provider(s) 120 may include various types of computing resources, such as data processing resources like application containers and VM instances, data storage resources, networking resources, data communication resources, network services, and the like.

Each type of computing resource provided by the CMFA system 100, the CMFA device 110, the trust authentication provider 118, and/or the application provider(s) 120 may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The CMFA system 100, the CMFA device 110, the trust authentication provider 118, and/or the application provider(s) 120 may also be configured to provide other types of computing resources not mentioned specifically herein.

The computing resources provided by the CMFA system 100, the CMFA device 110, the trust authentication provider 118, and/or the application provider(s) 120 may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 may include redundant and backup power, communications, cooling, and security systems. The data centers 700 may also be located in geographically disparate locations. One illustrative embodiment for a data center 700 that may be utilized to implement the technologies disclosed herein will be described below with regard to FIG. 8.

Figure 8:
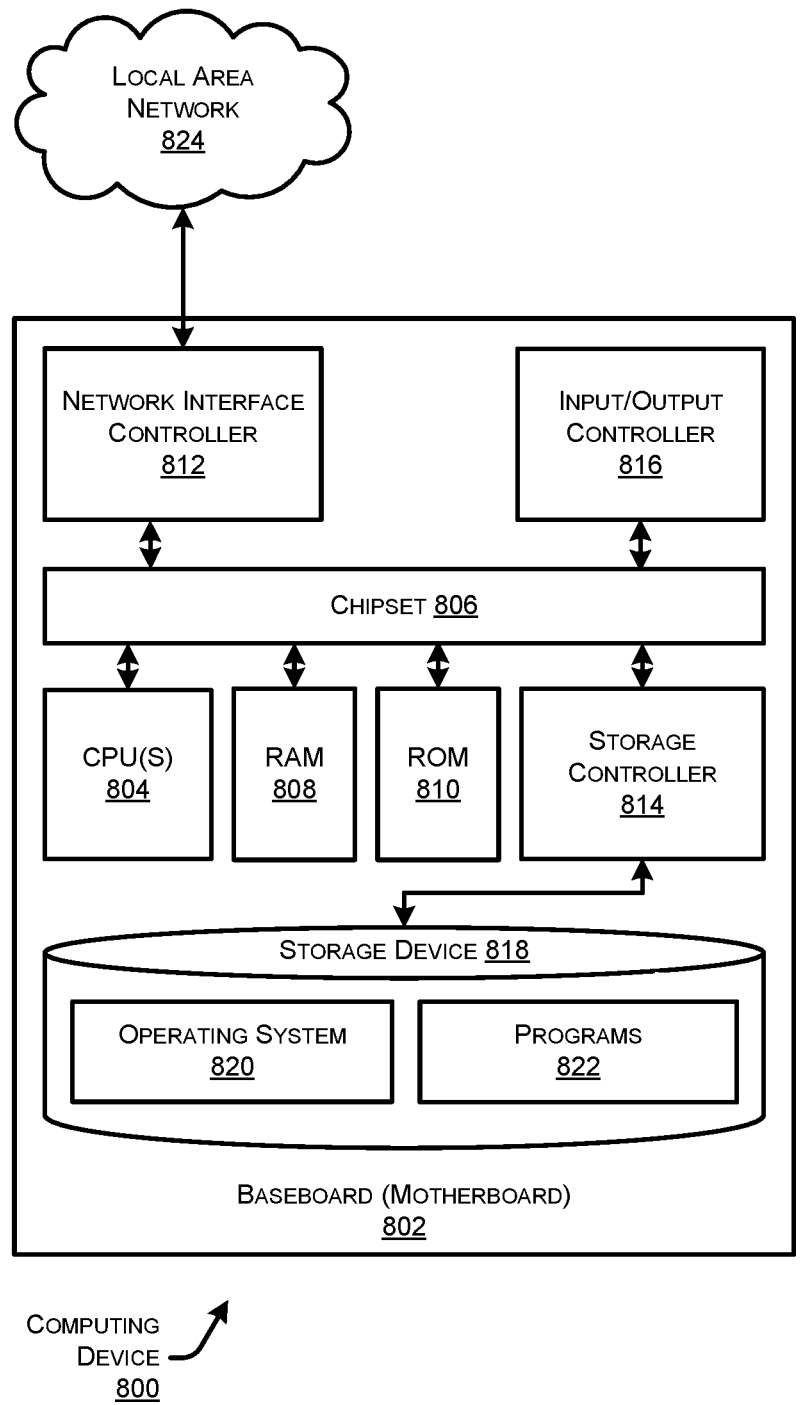
FIG. 8 is a computer architecture diagram showing an illustrative computer hardware architecture for implementing a server device that may be utilized to implement aspects of the various technologies presented herein.

FIG. 8 shows an example computer architecture for a computing device 800 such as the CMFA system 100, the CMFA device 110, the trust authentication provider 118, and/or the application provider(s) 120 capable of executing program components for implementing the functionality described herein. The computer architecture shown in FIG.

8 illustrates a conventional server computer, workstation, desktop computer, laptop, tablet, network appliance, e-reader, smartphone, or other computing device, and may be utilized to execute any of the software components presented herein. The computing device 800 may, in some examples, correspond to a physical server of a data center, the packet switching system 500, and/or the node 600 described herein with respect to FIGS. 5 and 6, respectively.

The computing device 800 includes a baseboard 802, or "motherboard," which is a printed circuit board to which a multitude of components or devices may be connected by way of a system bus or other electrical communication paths. In one illustrative configuration, one or more central processing units ("CPUs") 804 operate in conjunction with a chipset 806. The CPUs 804 may be standard programmable processors that perform arithmetic and logical operations necessary for the operation of the computing device 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computing device 800. The chipset 806 may further provide an interface to a computer-readable storage medium such as a read-only memory ("ROM") 810 or non-volatile RAM ("NVRAM") for storing basic routines that help to startup the computing device 800 and to transfer information between the various components and devices. The ROM 810 or NVRAM may also store other software components necessary for the operation of the computing device 800 in accordance with the configurations described herein.

The computing device 800 may operate in a networked environment using logical connections to remote computing devices and computer systems through a network, such as the network 824 (or 704). The chipset 806 may include functionality for providing network connectivity through a NIC 812, such as a gigabit Ethernet adapter. The NIC 812 is capable of connecting the computing device 800 to other computing devices over the network 824. It should be appreciated that multiple NICs 812 may be present in the computing device 800, connecting the computer to other types of networks and remote computer systems.

The computing device 800 may be connected to a storage device 818 that provides non-volatile storage for the computing device 800. The storage device 818 may store an operating system 820, programs 822, and data, which have been described in greater detail herein. The storage device 818 may be connected to the computing device 800 through a storage controller 814 connected to the chipset 806. The storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 800 may store data on the storage device 818 by transforming the physical state of the physical storage units to reflect the information being stored. The specific transformation of physical state may depend on various factors, in different embodiments of this description. Examples of such factors may include, but are not limited to, the technology used to implement the physical storage units, whether the storage device 818 is characterized as primary or secondary storage, and the like.

For example, the computing device 800 may store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the storage device 818 by detecting the physical states or characteristics of one or more particular locations within the physical storage units.

In addition to the mass storage device 818 described above, the computing device 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computing device 800. In some examples, the operations performed by the server computers 702, and or any components included therein, may be supported by one or more devices similar to computing device 800. Stated otherwise, some or all of the operations performed by the server computers 702, and or any components included therein, may be performed by one or more computing device 800 operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 818 may store an operating system 820 utilized to control the operation of the computing device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system may comprise the UNIX operating system or one of its variants. It should be appreciated that other operating systems may also be utilized. The storage device 818 may store other system or application programs and data utilized by the computing device 800.

In one embodiment, the storage device 818 or other computer-readable storage media is encoded with computer-executable instructions which, when loaded into the computing device 800, transform the computer from a general-purpose computing system into a special-purpose computer capable of implementing the embodiments described herein. These computer-executable instructions transform the computing device 800 by specifying how the CPUs 804 transition between states, as described above. According to one embodiment, the computing device 800 has access to computer-readable storage media storing computer-executable instructions which, when executed by the computing device 800, perform the various processes described above with regard to FIGS. 3 and 4. The computing device 800 may also include computer-readable storage media having instructions stored thereupon for performing any of the other computer-implemented operations described herein.

The computing device 800 may also include one or more input/output controllers 816 for receiving and processing input from a number of input devices, such as a keyboard, a mouse, a touchpad, a touch screen, an electronic stylus, or other type of input device. Similarly, an input/output controller 816 may provide output to a display, such as a computer monitor, a flat-panel display, a digital projector, a printer, or other type of output device. It will be appreciated that the computing device 800 might not include all of the components shown in FIG. 8, may include other components that are not explicitly shown in FIG. 8, or might utilize an architecture completely different than that shown in FIG. 8.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A non-transitory computer-readable medium storing instructions that, when executed, causes a processor to perform operations, comprising:
   determining, by a network device, to perform wireless sensing based at least in part on a continuous multi-factor authentication (CMFA) application executing on a computing device;
   collecting, at the network device, channel state information (CSI) data associated with a connection between the network device and the computing device, the CSI data including an indication of static objects and non-static objects in an environment of the computing device;
   transmitting the CSI data to a CMFA device; and
   receiving a trust score from the CMFA device, the trust score being determined by the CMFA device based at least in part on the non-static objects indicated by the CSI data.

2. The non-transitory computer-readable medium of claim 1, the operations further comprising:
   detecting a change in the CSI data; and
   receiving an updated trust score from the CMFA device, the updated trust score being determined based at least in part on the change in the CSI data.

3. The non-transitory computer-readable medium of claim 2, the operations further comprising adjusting access via the computing device to at least one resource provided to the computing device based at least in part on the updated trust score.

4. The non-transitory computer-readable medium of claim 1, the operations further comprising establishing, by the network device, baseline CSI data.

5. The non-transitory computer-readable medium of claim 1, the operations further comprising adjusting access to the computing device based at least in part on the trust score.

6. The non-transitory computer-readable medium of claim 1, the operations further comprising adjusting access via the computing device to at least one resource provided to the computing device based at least in part on the trust score.

7. The non-transitory computer-readable medium of claim 1, wherein the collecting of the CSI data at the network device comprises collecting the CSI data associated with a connection between a plurality of network devices and the computing device.

8. The non-transitory computer-readable medium of claim 1, wherein the CSI data comprises:
   long cycles defining the static objects within the environment of the computing device; and
   short cycles defining the non-static objects within the environment of the computing device.

9. A system comprising:
   a processor; and
   a non-transitory computer-readable media storing instructions that, when executed by the processor, causes the processor to perform operations comprising:
      determining, by a network device, to perform wireless sensing based at least in part on a continuous multi-factor authentication (CMFA) application executing on a computing device;
      collecting, at the network device, channel state information (CSI) data associated with a connection between the network device and the computing device, the CSI data including an indication of static objects and non-static objects in an environment of the computing device;
      transmitting the CSI data to a CMFA device; and
      receiving a trust score from the CMFA device, the trust score being determined by the CMFA device based at least in part on the non-static objects indicated by the CSI data.

10. The system of claim 9, the operations further comprising:
    detecting a change in the CSI data; and
    receiving an updated trust score from the CMFA device, the updated trust score being determined based at least in part on the change in the CSI data.

11. The system of claim 10, the operations further comprising adjusting access via the computing device to at least one resource provided to the computing device based at least in part on the updated trust score.

12. The system of claim 9, the operations further comprising establishing, by the network device, baseline CSI data.

13. The system of claim 9, the operations further comprising adjusting access to the computing device based at least in part on the trust score.

14. The system of claim 9, the operations further comprising adjusting access via the computing device to at least one resource provided to the computing device based at least in part on the trust score.

15. The system of claim 9, wherein the collecting of the CSI data at the network device comprises collecting the CSI data associated with a connection between a plurality of network devices and the computing device.

16. The system of claim 9, wherein the CSI data comprises:
   long cycles defining the static objects within the environment of the computing device; and
   short cycles defining the non-static objects within the environment of the computing device.

17. A method of continuous multi-factor authentication, comprising:
   determining, by a network device, to perform wireless sensing based at least in part on a continuous multi-factor authentication (CMFA) application executing on a computing device;
   collecting, at the network device, channel state information (CSI) data associated with a connection between the network device and communicatively coupled to the computing device, the CSI data including an indication of static objects and non-static objects in an environment of the computing device;
   transmitting the CSI data to a CMFA device; and
   receiving a trust score from the CMFA device, the trust score being determined by the CMFA device based at least in part on the non-static objects indicated by the CSI data.

18. The method of claim 17, further comprising:
   detecting a change in the CSI data;
   receiving an updated trust score from the CMFA device, the updated trust score being determined based at least in part on the change in the CSI data; and
   adjusting access via the computing device to at least one resource provided to the computing device based at least in part on the updated trust score.

19. The method of claim 17, further comprising adjusting access to the computing device based at least in part on the trust score.

20. The method of claim 17, further comprising adjusting access via the computing device to at least one resource provided to the computing device based at least in part on the trust score.

* * * * *